United States Patent [19]

Ogawa et al.

[11] Patent Number: 4,949,096

[45] Date of Patent: Aug. 14, 1990

[54] LASER PRINTER WITH THERMAL FIXING OF TONER

[76] Inventors: Toshitaka Ogawa; Yasuo Kikuchi; Tomio Sugaya; Isao Nakajima; Takashi Suzuki; Shigenobu Katagiri, all of Ibaraki, Japan

[21] Appl. No.: 399,110

[22] Filed: Aug. 28, 1989

[30] Foreign Application Priority Data

Sep. 2, 1988 [JP] Japan ................................ 63-220741

[51] Int. Cl.[5] ........................ G01D 9/00; G03G 15/00; B05C 1/00

[52] U.S. Cl. ...................................... 346/25; 355/285; 355/290; 118/60; 118/101; 118/260

[58] Field of Search .................... 346/25, 76 PH, 140; 355/282, 283, 284, 285, 290; 219/216 PH; 118/60, 101, 260, 257, 266, 267, 268

[56] References Cited

U.S. PATENT DOCUMENTS 4,086,871 5/1978 Rydeen et al. ........................ 118/60

4,751,548 6/1988 Lawson .............................. 118/268

*Primary Examiner*—Mark J. Reinhart

*Attorney, Agent, or Firm*—James R. Longacre; Michael L. Keller

[57] ABSTRACT

A laser printer with a thermal fixing unit comprises: a pair of heat and pressure rolls for pressing a sheet with a developed toner image therebetween to fix the toner image on the sheet; a web immersable with an oil; an oil coater for supplying the oil to the web and pressing the web against the heat roll at at least one point to make the web contact with the heat roll so that the oil is applied from the oil coater onto the surface of the heat roll through the web to thereby prevent occurrence of offset of the toner image; and at least one pressing member provided separately from the oil coater for locally urging the web against the heat roll, the pressing member being located on at least one of before and behind the oil coater.

8 Claims, 2 Drawing Sheets

LASER PRINTER WITH THERMAL FIXING OF TONER

BACKGROUND OF THE INVENTION

1. Field of the Invention

The present invention relates to a laser printer having a thermal fixing mechanism constituted by a heat roll, an oil coater, and the like.

2. Description of the Prior Art

Referring to FIGS. 1 through 3, a conventional laser printer will be described hereunder.

In the conventional printer with a thermal fixing mechanism, an electrostatic latent image is formed on a drum 1, the electrostatic latent image is developed with a developer 2 so as to form a toner image, and the toner image is transferred onto paper 4 by a transfer device 3. Then, the transferred toner image is preheated by a preheater 5 together with the paper 4, and pressured by means of a heat roll 6 and a pressure roll 7 so as to be thermally fixed. Being made of thermoplastic resin, the toner is fused to be fixed by the heat roll 6 heated to about 250° C. At this time, in order to prevent generation of so-called offset that the toner partially adheres onto the heat roll 6, the surface of the heat roll 6 is coated at a point A with fuser oil, as disclosed in U. S. Pat. No. 4,182,263. The oil is reserved in a tank (not shown) so as to be supplied by a pump to an orifice 9 of an oil coater 8. A web 10 made of felt and having a thickness of about 1 mm is able to be impregnated with the oil. The oil coater 8 is urged by springs 11 so as to press the web 10 against the heat roll 6 at the point A, so that the oil is applied from the surface B of the oil coater 8 onto the heat roll 6 through the web 10. The heat roll 6 is rotating at a fixed speed in the direction of an arrow C in FIG. 2 so that the whole surface of the heat roll 6 is coated with the oil. The web 10 is pressed against the heat roll 6 at a point E of the oil coater 8 so that offset toner is removed from the surface of the heat roll 6 in case of occurrence of toner offset. Being channel-like shaped, the coater 8 is in contact with the web 10 also at a point F. The web 10 is moving relatively slowly from a supply roll 12 to a take-up roll 13, and tension T always acts on the web 10 because a frictional force acts between the heat roll 6 and the web 10. A relatively strong force is required for removing offset toner at the point E, while a weak force only capable of preventing occurrence of any gap between the oil coater 8, the web 10 and the heat roll 6 suffices at the point A.

In this configuration, however, these two forces cannot be controlled and the foregoing aimed function cannot be attained, for the two reasons as follows.

The first reason is that it is very difficult to make the oil coater 8 come in contact with the cylindrical heat roll 6 through the web 10 at the three points. The pressing forces at the three contacting points vary depending on various sizes such as the sizes $l_1$ and $l_2$ of the oil coater 8, the size in the vertically positional relation between the heat roll 6 and the oil coater 8, and the like.

The second reason is that the tension T acts on the web 10 as described above and the horizontal component of the tension T acts on the oil coater 8 at the points E and F to thereby push-down the oil coater 8 to the left. If the oil coater 8 moves down to the left, the oil coater 8 is separated from the web 10 at the point A, so that the oil is not normally applied onto the heat roll 6 at the point A to thereby generate a problem. The tension T is caused by the frictional force generated between the heat roll 6 rotating in the direction of the arrow C and the web 10 slowly moving in the direction of an arrow D in FIG. 2. The tension T scatters depending on the surface conditions of the web 10 and the heat roll 6, the oil adhesion condition on the heat roll 6, and the like, and it is difficult to correct the force of the coater 8 correspondingly to the tension T by using the springs 11 in advance. If the forces of the springs 11 are set to be large, the load of a motor (not shown) for rotating the heat roll 6 becomes large to cause another problem.

Further, in the case where a gap is generated between the oil coater 8 and the web 10 so that the oil falls down without being applied onto the heat roll 6 at the point A, there is little possibility that the oil can be applied from the surface of the web 10 onto the surface of the heat roll 6 sufficiently and uniformly at the point E, because the web 10 is carrying offset toner on the surface thereof at the point E.

There is a further conventional example in which in order to solve the foregoing problem that the heat roll is not sufficiently coated with oil for the reasons of the foregoing defects the supply quantity of oil is excessively increased and the surplus oil is recovered. In this conventional printer, however, there has been such a drawback that a surplus oil recovering system is complicated.

SUMMARY OF THE INVENTION

It is therefore an object of the present invention to eliminate the foregoing drawbacks in the prior art.

It is another object of the present invention to provide a laser printer which is improved in the reliability thereof.

The present invention has been attained by improving the arrangement, structure, etc., of the oil coater, the web, the heat roll, the pressing members, and the like, on the basis of the fact that the load necessary for coating oil is substantially different in degree from the load necessary for preventing toner from being gotten over and in order to control the loads to be predetermined values respectively it is necessary to provide the structure so as to press the oil coater and the pressing members separately from each other against the web, that the load for pressing the oil coater against the web is not influenced by the tension if the tension of the web is received by a member provided separately from the oil coater, and that the load at each contacting point can be easily controlled if the oil coater is made to contact against the heat roll at one or two points because the heat roll is cylindrical and it is difficult to make three-point contact between the oil coaster and the heat roll.

DETAILED DESCRIPTION OF THE PREFERRED EMBODIMENTS

Figure 1:
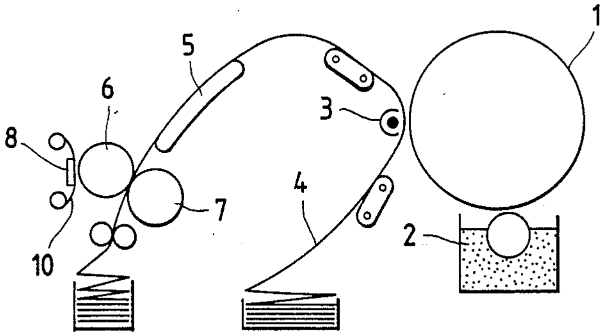
FIG. 1 is a sectional view showing a conventional laser printer.
Figure 3:
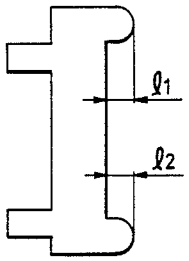
FIG. 3 is an enlarged diagram showing the oil coater of FIG. 2.
Figure 2:
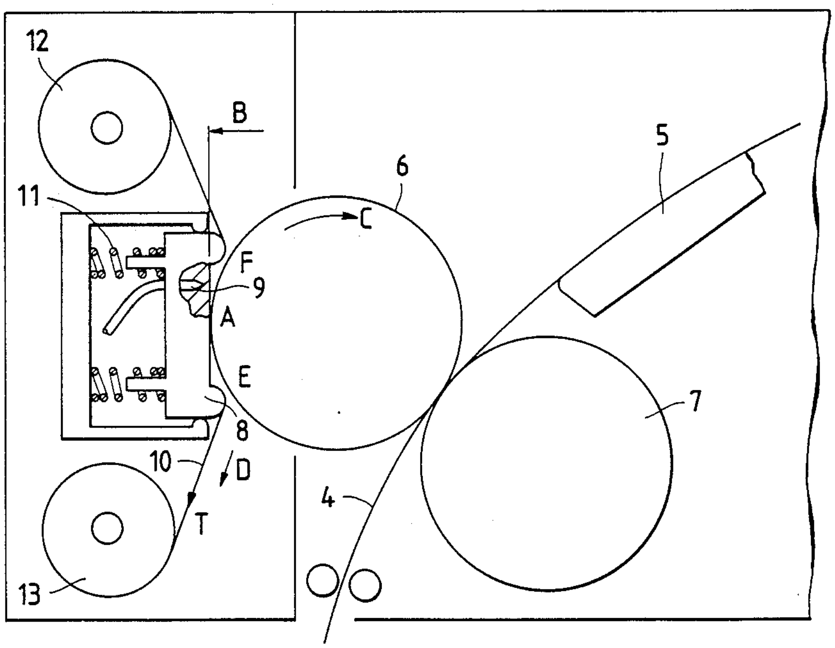
FIG. 2 is a schematic view showing the thermal fixing portion of the conventional laser printer.
Figure 4:
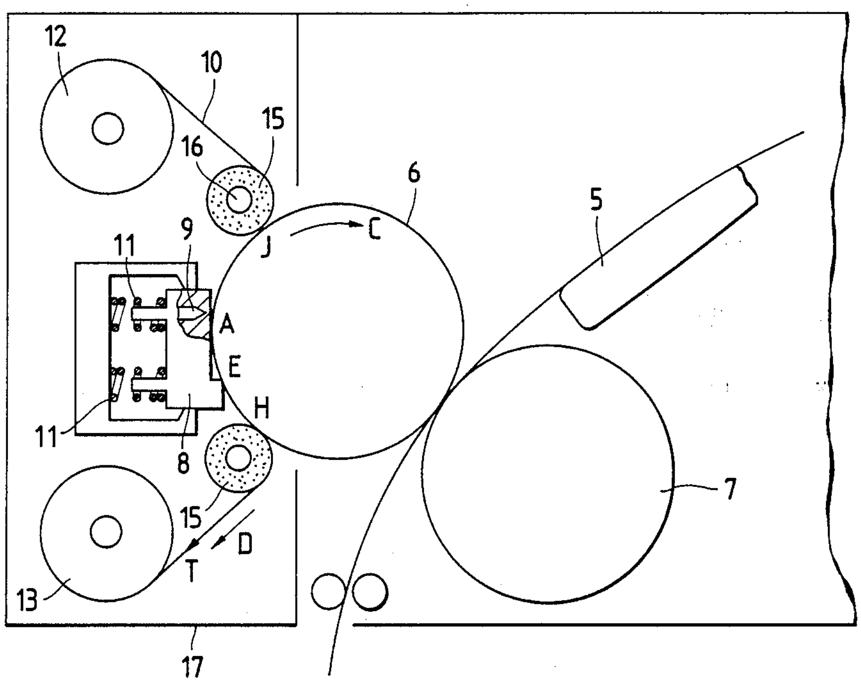
FIG. 4 is a schematic view showing the thermal fixing portion of the laser printer according to the present invention.
Figure 5:
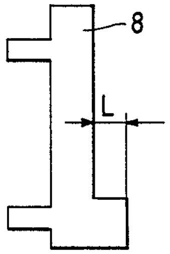
FIG. 5 is an enlarged diagram showing the oil coater in FIG. 4.

Referring to FIGS. 4 and 5, a specific embodiment of the laser printer according to the present invention will be described hereunder.

In this embodiment, a pair of pressing members 15 for removing offset toner are provided separately from an oil coater 8 for coating a heat roll 6 with fuser oil through a web 10. The web 10 fed from a supply roll 12 is taken up by a take-up roll 13 while being guided by the pressing members 15 so as to pass around the heat roll 6. The two pressing members 15 are provided above and below the oil coater 8 so as to press the web 10 against the heat roll 6 at points J and H. The oil coater 8, on the other hand, presses the web 10 against the heat roll 6 at a point A. Being L-shaped, the oil coater 8 is in contact with the web 10 at two points A and E.

Consideration is given so that the oil coater 8 is pressed from substantially just behind by springs 11 toward the heat roll at the points A and E so that the oil coater 8 surely contacts with the web 10 at the points A and E even if the size L of the oil coater 8 scatters by 1–2 mm in production. The pressing force of each of the springs 11 is relatively weak to be 100 g–200 g so as to softly press an oil ejecting orifice 9 of the oil coater 8 against the web 10. It is contrived that the spring constant of each of the springs 11 is set to a sufficiently small value of about 10 g/mm so that the pressing force of the oil coater 8 does not remarkably vary in response to the scattering of the size L or the like. The pressing members 15 have a function for relatively strongly pressing the web 10 against the heat roll 6 so as to remove toner offset on the heat roll 6 and another function as a guide for taking-up the web 10 from the supply roll 12 to the take-up roll 13. The two functions will be described hereunder.

Offset toner is removed mainly by the aid of the pressing member 15 at the point H, and if the offset toner remains without being removed at the point H, the remainder offset toner is removed by the aid of the other pressing member 15 at the point J. Each of the pressing members 15 is constituted by an iron shaft 16 and a rolled foam rubber fixed on the outer circumference of the iron shaft 16, and rotatably supported by a casing 17. In use, the heat roll 6 is rotating at about 60 rpm in the direction of an arrow C in FIG. 4, and the web 10 is slightly moving in the direction of an arrow D in the drawing. The pressing members 15 is rotating following the movement of the web 10, and pressing the web 10 against the heat roll 6 with a force of about 500 g at the point H. The offset toner removed at this point is taken up by the take-up roll 13 in the state where the toner adheres on the web 10. Even if the relative position between the heat roll 6 and the pressing members 15 is slightly changed the load for pressing the web 10 against the heat roll 6 at the point H is not remarkably varied because each of the pressing members 15 is formed of a foam rubber roll. It is a matter of course that the load is not influenced at all by the pressing forces of the springs 11 pressing the oil coater 8. Since the pressing members 15 are rotatably supported by the frame 17, the load of the motor (not shown) for rotating the take-up roll 13 is not so increased. A frictional force is generated between the heat roll 6 and the web 10 due to a difference in speed therebetween so that tension T acts on the web 10 as shown in FIG. 4 in the same manner as in the conventional example. The horizontal component of the tension T is however received by the pressing members 15 provided above and below the oil coater 8 while acting as guides, so that the oil coater 8 is hardly influenced by the tension T. Consequently, the oil coater 8 can stably press the web 10 at the point A regardless of the tension T of the web 10.

Although the oil coater 8 is L-shaped so as to press the web 10 at two points in the above specific embodiment, the present invention is not limited to this embodiment and the oil coater 8 may be formed so as to have a flat surface to press the web 10 at one point. Further, although the pressing members 15 are provided above and below the oil coater 8, the present invention is not limited to this embodiment and only one pressing member 15 may be provided only below the oil coater 8.

According to the present invention, the oil coater and at least one pressing member are provided separately from each other so that the oil coater and the pressing member are pressed onto the heat roll separately from each other, the oil coater being made to press the heat roll surely at least one point, the pressing members being made to act also as guides for taking-up the web. Therefore, it is possible to control the force for urging each of the oil coater and the pressing member against the heat roll through the web to be a predetermined value, so that oil coating of the heat roll and removal of offset toner can be surely performed. The oil supply quantity can be reduced to a necessary minimum with no oil dropping below the oil coater.

What is claimed is:

1. A laser printer with a thermal fixing unit, said thermal fixing unit comprising:

a pair of heat and pressure rolls for pressing a sheet with a developed toner image therebetween to fix said toner image on said sheet;

a web immersable with an oil;

an oil coater for supplying said oil to said web and pressing said web against said heat roll at least one point to make said web contact with said heat roll so that said oil is applied from said oil coater onto the surface of said heat roll through said web to thereby prevent occurrence of offset of said toner image; and at least one pressing means provided separately from said oil coater for locally urging said web against said heat roll, said pressing means being located on at least one of before and behind said oil coater.

2. A laser printer according to claim 1, further comprising:

a supply roll for supplying said web;

a take-up roll for taking up said web after said web supplied from said supply roll has been made to contact with said heat roll by said oil coater.

3. A laser printer according to claim 1, wherein said at least one pressing means comprises a pair of cylindrical elastic rolls which are rotatably provided in each of the positions before and behind said oil coater, respectively, said pressing members acting also as a guide member for guiding said web on a path for taking up said web.

4. A laser printer according to claim 1, in which said oil coater urges against web against said heat roll by a relatively weaker force and said pressing means presses said web toward said heat roll by a relatively stronger force.

5. A laser printer according to claim 3, in which said oil coater urges against web against said heat roll by a relatively weaker force and said pressing means presses said web toward said heat roll by a relatively stronger force.

6. A laser printer according to claim 3, wherein said oil coater is L-shaped.

7. A laser printer according to claim 1, wherein said oil coater presses said web against said heat roll at one point.

8. A laser printer according to claim 1, wherein said oil coater presses said web against said heat roll at two points.

* * * * *